(12) United States Patent
Qiu et al.

(10) Patent No.: US 7,725,504 B2
(45) Date of Patent: May 25, 2010

(54) METHOD AND APPARATUS FOR HELPING USER FORM STRUCTURED DIAGRAM FROM UNSTRUCTURED INFORMATION SOURCE

(75) Inventors: Zhao Ming Qiu, Beijing (CN); Guo Tong Xie, Xi Er Qi (CN); Dong Liu, Beijing (CN); Gang Hu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 11/390,924

(22) Filed: Mar. 28, 2006

(65) Prior Publication Data

US 2008/0263004 A1 Oct. 23, 2008

(51) Int. Cl.
*G06F 7/00* (2006.01)
*G06F 9/45* (2006.01)
*G06F 17/00* (2006.01)

(52) U.S. Cl. ................ 707/811; 707/790; 177/143; 177/156; 715/200

(58) Field of Classification Search ........... 707/5
See application file for complete search history.

(56) References Cited

U.S. PATENT DOCUMENTS 5,680,530 A * 10/1997 Selfridge et al. ............ 345/440
7,174,348 B1 * 2/2007 Sadhu et al. ............. 707/104.1
7,509,313 B2 * 3/2009 Colledge et al. ............... 707/5
2004/0210829 A1 * 10/2004 Cristofari et al. ........ 715/501.1
2005/0154691 A1 * 7/2005 Higgins et al. ................ 706/46
2005/0204367 A1 * 9/2005 Minium et al. .............. 719/328
2005/0229167 A1 * 10/2005 Henning et al. ............. 717/143

* cited by examiner

*Primary Examiner*—Etienne P LeRoux
*Assistant Examiner*—Cindy Nguyen
(74) *Attorney, Agent, or Firm*—Leonard T. Guzman

(57) ABSTRACT

The present invention provides a method and apparatus for helping a user form a structured diagram from an unstructured information source. Starting with one or more key information elements such as some special words, the requests of a customer contained in the information source can be obtained by performing interactive and iterative searching in the unstructured information source such as text, audio, video and etc., the artifacts representing them are drawn in the diagram, and linkages are established between the artifacts and the corresponding contents in the information source. The present invention also proposes that the distribution of established linkages can be used to check whether all the requests in the information source have been extracted in the diagram. Further, various levels of warnings can be shown according to the density of linkage distribution. Therefore the user can draw a structured diagram more conveniently and quickly, and can perform checking and reusing more easily.

12 Claims, 5 Drawing Sheets

METHOD AND APPARATUS FOR HELPING USER FORM STRUCTURED DIAGRAM FROM UNSTRUCTURED INFORMATION SOURCE

BACKGROUND OF THE INVENTION

1. Field of the Invention

The present invention relates to a method and apparatus for helping user form a structured diagram from unstructured information source, wherein at least one artifact is formed in the structured diagram to represent at least one information element included in the unstructured information source, the information element being the objects or the interactive relations among the objects, involved in the unstructured information source.

2. Description of the Prior Art

Nowadays, visualization plays a critical role in a process for concisely and precisely describing a system. Usually, when people want to design a new system, they may start with collecting necessary information and knowledge in the form of text, audio or video. After finishing this phase, they need to set up the architecture of the system in a form of diagrams, such as modeling, sitemap, blueprint etc, as the basis for further development work, in which the essence of this system is most clearly displayed. This procedure is of particular importance to those large and complex systems. It is an important issue of system design to help people develop formal, structured diagrams from informal, unstructured information.

Taking IT architecture design as an example, there are already several formally defined diagrams to describe different aspects of a to-be-built IT system. In the case of using UML (Unified Modeling Language), there are class, object, use case, sequence, collaboration, state chart, activity component, and deployment diagram etc. A system architect develops these diagrams based on customer requirements which are normally present in text form (interview record, files provided by customer etc). There are already some tooling software to facilitate architects to generate these diagrams now. AWB (Architect's Workbench) is an example of such tooling software which is currently available. By reading and analyzing the text description in the AWB environment, the software helps an architect identify various artifacts like actor, use case etc. and build linkages between artifacts in the diagrams and their counterparts in the text files.

However, in an AWB practice, it is tedious and time consuming to read every word in the document, and then to go through the manual process to create various artifacts. It is a hard work especially for large and complex systems, since there might be hundreds or thousands pages of text for the architects to read.

Therefore, what is needed is a method and apparatus for more efficiently helping a user form a structured diagram conveniently and quickly from unstructured information source.

SUMMARY OF THE INVENTION

The object of the present invention is to provide a method and apparatus capable of helping a user form a structured diagram easily from unstructured information source.

According to one aspect of the present invention, a method for helping a user form a structured diagram from unstructured information source is provided, which is abbreviated as a structured diagram drawing auxiliary method hereinafter, wherein at least one artifact is formed in the structured diagram to represent at least one information element included in the unstructured information source, the information element being the objects or the interactive relations among the objects involved in the unstructured information source. The structured diagram drawing auxiliary method comprises the following steps: receiving a search item which is inputted by the user and represents an information element; searching for the contents related to the information elements represented by the search item in the unstructured information source based on the search item inputted by the user; and for each information element, creating linkages between the artifact formed in the structured diagram and the corresponding position(s) of the related content searched in the unstructured information source.

The structured diagram drawing auxiliary method may further comprise the step of forming one or more artifacts corresponding to the information elements, in the structured diagram based on the searched contents.

The structured diagram drawing auxiliary method may further comprise the following steps: displaying the searched contents to help the user extract other search items representing other information elements correlated with said information elements, so as to allow the user to further add other artifacts corresponding to the other information elements into the structured diagram; and when the user inputs a search item representing other information elements again, further performing the operations of searching and creating linkage for the inputted search item.

The structured diagram drawing auxiliary method may further comprise the step of computing the distribution of the linkages in the unstructured information source.

The structured diagram drawing auxiliary method may further comprise the step of showing warnings for the parts with few linkages or no linkage at all.

The structured diagram drawing auxiliary method may also show various levels of warnings based on the linkage distribution density.

The structured diagram drawing auxiliary method may also search for contents containing the objects which are of the same kind with said object. That is, the structured diagram drawing auxiliary method may further comprise the steps of: analyzing the search item which is inputted by the user and represents an information element; providing other search items which may represent the information element; and searching for the contents related to the information element in the unstructured information source based on said other search items.

The structured diagram auxiliary method may further comprise the following step: when finding a continuous part of contents in the unstructured information source which describes the information elements corresponding to all the artifacts constituting a sub-diagram in the structured diagram and is not related to other artifacts, creating a linkage between the sub-diagram and the position of the continuous contents in the unstructured information source.

According to another aspect of the present invention, an apparatus for helping a user form a structured diagram from unstructured information source is provided, which is abbreviated as a structured diagram drawing auxiliary apparatus hereinafter, wherein at least one artifact is formed in the structured diagram to represent at least one information element included in the unstructured information source, the information element being the objects or the interactive relations among the objects involved in the unstructured information source. The structured diagram drawing auxiliary apparatus comprises: a receiving device for receiving a search item which is inputted by the user and represents an information element; a searching device for searching for the contents related to the information elements represented by the search item in the unstructured information source based on the search item inputted by the user; and a linkage creating device for creating a linkage between the corresponding artifact formed in the structured diagram and the position of the related content searched in the unstructured information source for each information element.

The structured diagram drawing auxiliary apparatus may further comprise a structured diagram managing device for forming one or more artifacts corresponding to the information elements in the structured diagram based on the searched contents.

The structured diagram drawing auxiliary apparatus may further comprise a display device for displaying the searched contents to help the user extract other search items representing other information elements correlated to said information elements, so as to allow the user to further add other artifacts corresponding to the other information elements into the structured diagram, wherein when the user further inputs a search item representing other information elements via the receiving device, the searching device and the linkage creating device further perform the operations of searching and creating linkage with respect to the other information element, respectively.

The structured diagram drawing auxiliary method may further comprise a linkage distribution computing device for computing the distribution of the linkages in the unstructured information source.

The structured diagram drawing auxiliary apparatus may further comprise a warning generating device for generating warnings for the parts with few linkages or no linkage at all.

The structured diagram drawing auxiliary apparatus may further comprise a linkage distribution classifying device for classifying the respective parts in the unstructured information source into a plurality of levels based on the linkage distribution density of the respective parts; and a warning generating device for generating different levels of warnings for different parts based on their different linkage distribution levels.

The structured diagram drawing auxiliary apparatus may further comprise a search item analyzing device for analyzing the search item which is inputted by the user and represents an information element, providing other search items which may also represent the same information element, and providing them together with the search item inputted by the user to the searching device for searching.

The structured diagram drawing auxiliary apparatus may further comprise an identifying device for identifying whether there is a continuous part of the contents in the unstructured information source that describes the information elements corresponding to all the artifacts constituting a sub-diagram in the structured diagram and is not related to other artifacts, wherein when the identifying device identifies that there does exist such a continuous part of the contents, the linkage creating device further creates a linkage between the sub-diagram and the position of the continuous contents in the unstructured information source.

By utilizing the method and apparatus according to the present invention, the efficiency of the architects or draftsmen in the diagram drawing process (DDP) can be greatly improved, and the checking and reusing can be made easier even if the original architect or draftsman is absent.

In addition, the present invention has the following advantages:

1. Reduce the workload of the architect (draftsman). With the help of a searching device, there is no need to carefully read all text files which may be very long and complicated in case for a large complex system. The architect needs only to read those relevant parts returned by the searching device.

2. Make the design more complete and accurate. If the text files are too many or too long, it is hard for people to capture and remember all the requests in the texts. The present invention can easily return all relevant parts that the architect wants to know by searching. By calculating the distribution of the linkages, the probability of missing necessary information in the diagram may be substantially reduced.

DETAILED DESCRIPTION OF THE PREFERRED EMBODIMENT

In the present invention, in order to draw formal structured diagrams from informal unstructured information, one can start from one or several key information elements (some special words, for example), obtain customer's requests contained in the unstructured information source (text, audio, video etc.) by interactively and iteratively searching the unstructured information source, form artifacts representing the information elements in the structured diagram, and establish linkages between the formed artifacts and corresponding contents in the information source. In this specification, the term "information element" refers to the objects, the interactive relations among the objects, and so on, involved in unstructured information source, while the term "artifact" refers to the representation of the information element in the form of text, graph and so on in the structured diagram.

The present invention also proposes to use the distribution of the established linkages to detect whether all the requests in the information source are digested in the diagrams. And various levels of warnings can be shown based on the linkage distribution analysis.

The method and apparatus for helping a user (architect or draftsman) draw structured diagram from unstructured information source according to the present invention will be described in detail hereinafter with reference to the drawings.

Figure 1:
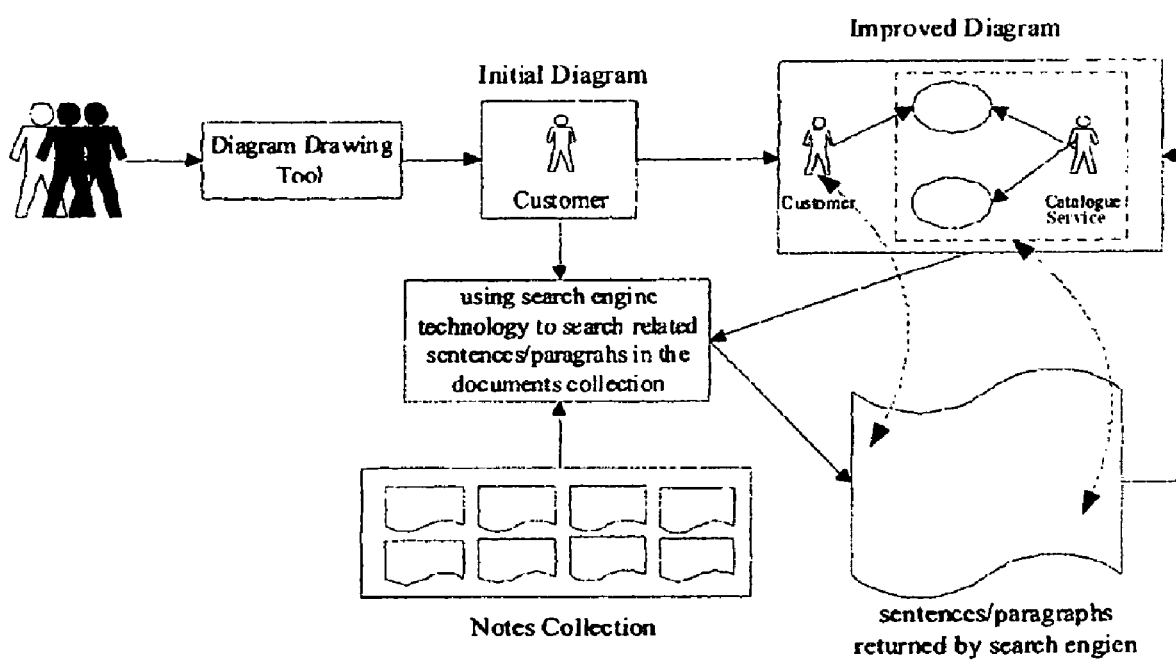
FIG. 1 depicts the interactive and iterative diagram drawing process based on searching technology according to the present invention.

First, the interactive and iterative diagram drawing process based on searching technology according to the present invention will be briefly described with reference to FIG. 1.

It is assumed that there are many notes generated during customer engagements, containing the exact customer requirements present in a form of unstructured information (such as text). When an architect wants to develop a structured diagram such as use case diagram in UML, he/she can select a first information element to build the initial part of the structured diagrams based on his expertise and preliminary understanding on the project, forming an artifact corresponding to the information element therein. For example, if the architect knows there should be a use case related to a customer, he/she will draw an Actor icon named Customer.

Then the architect will do some searching operations based on the word "Customer". The searching device returns all sentences or paragraphs related to the word "Customer", for example, "Customers will be able to browse catalogue and order goods 'on line' from their own PC." From this sentence/paragraph, the architect can create more artifacts in the use case diagram, such as two use cases named "browse catalogue" and "order goods", and another Actor named "Catalogue Service". Then the architect can further search "Catalogue" to find "Customer will then be able to use these physical catalogues to place orders by telephone". Based on these returned texts, the architect can select and build corresponding class, object, use case, sequence, collaboration, state chart, activity component, and deployment diagram etc. related to the actor "Customer", system "Order Management System" etc. with no need to read all the text notes word by word.

With each returned finding, if it is used in the diagram drawing, that is to say, a new element is added in the structured diagram, the corresponding linkage will also be created. Continuing this interactive and iterative searching-drawing procedure, the system of the present invention helps the architect extract various information elements from the unstructured information source in the form of text notes to build up a structured diagram. The information element herein can be an object involved in unstructured information source, such as "customer", "catalogue service" and etc., indicated by the human-shaped symbols in FIG. 1; and also it can be an event, a use case and etc. that may occur among the objects, in other words, the interactive relations among the objects, indicated by the arrow and the ellipse in FIG. 1. Of course, the information elements that can be extracted from the unstructured information source are not limited to the contents mentioned here, and the symbols for representing these information elements (the representation form of artifacts) in the structured diagram are also not limited to the symbols mentioned here. While here the unstructured information source in the form of text is taken as an example for depiction, those skilled in the art should understand, based on searching schemes such as audio, video ones and etc., the present invention is completely applicable for the unstructured information source of other forms such as audio, video and etc.

Figure 2:
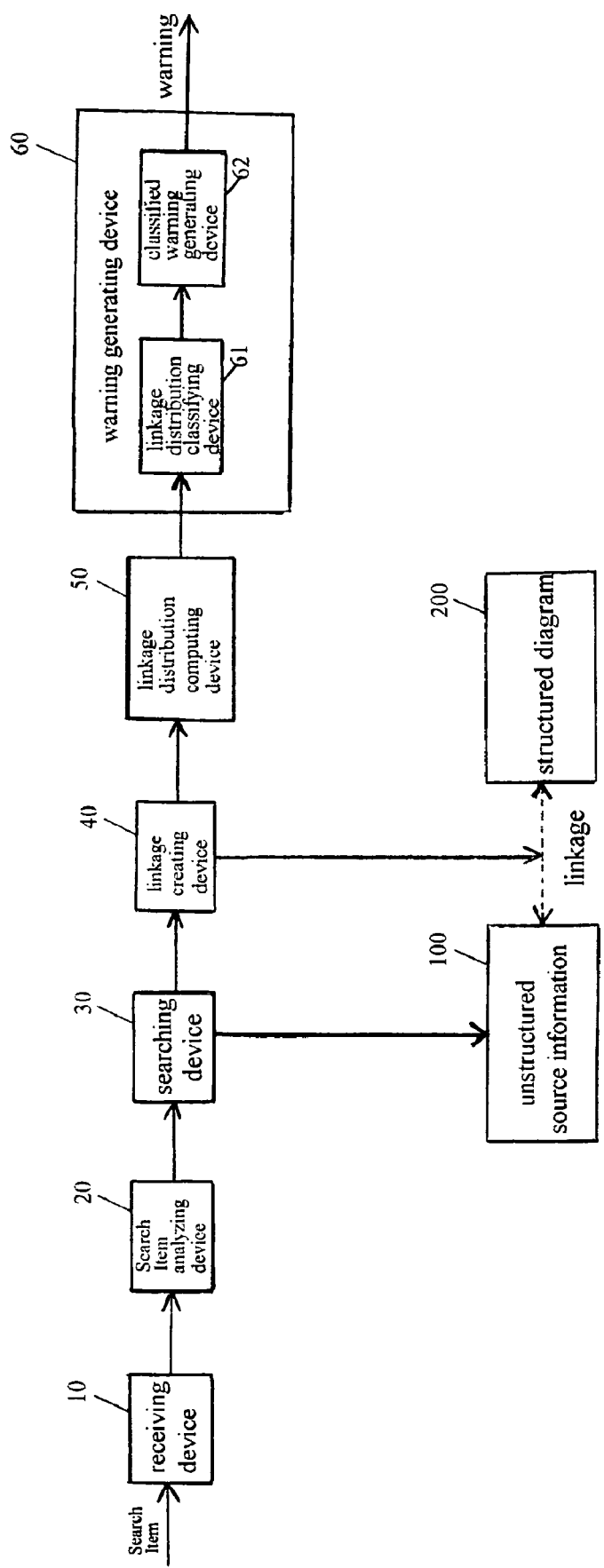
FIG. 2 shows the block diagram of the structured diagram drawing auxiliary apparatus according to an embodiment of the present invention.
Figure 3:
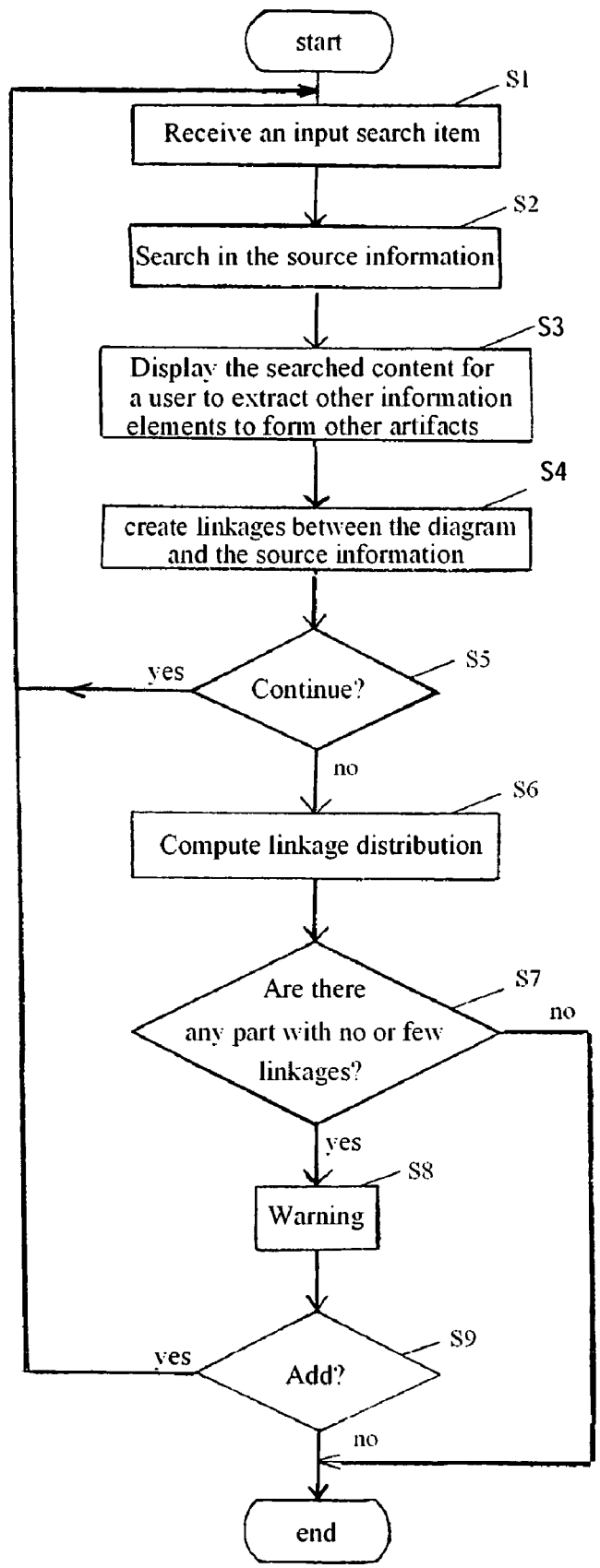
FIG. 3 is the flowchart of the structured diagram drawing auxiliary method according to the present invention.

The structured diagram drawing auxiliary method and apparatus according to the present invention will be described in conjunction with FIGS. 2 and 3 hereinafter, wherein FIG. 2 shows a block diagram of a structured diagram drawing auxiliary apparatus according to an embodiment of the present invention, and FIG. 3 is a flowchart of a structured diagram drawing auxiliary method according to the present invention. While FIG. 2 shows in detail all devices in the structured diagram drawing auxiliary apparatus according to the present invention, and FIG. 3 shows in detail all steps of the structured diagram drawing auxiliary method according to the present invention, those skilled in the art should understand, not all these devices and steps are essential technical features of the present invention.

The structured diagram drawing auxiliary method according to the present invention starts with an architect inputting a search item (i.e. searching target) into a receiving device 10. At step S1, the receiving device 10 receives the search item representing an information element, inputted by the architect, such as "customer" in the example of FIG. 1. At step S2, a searching device 30 searches for the content related to this information element in unstructured information source 100 based on the search item inputted by the user. In FIG. 2, a search item analyzing device 20 is also shown between the receiving device 10 and the searching device 30, the search item analyzing device 20 is not indispensable, its function will be described with respect to FIG. 4 below.

At step S3, the searched contents is displayed on a displaying device (not shown), and the architect/draftsman can extract other information elements related to the first information element inputted previously therefrom, so that a structured diagram managing device (not shown) can add other artifacts representing other information elements into the structured diagram based on the searched contents.

Next at step S4, a linkage creating device 40 creates linkages between the corresponding artifacts formed in the structured diagram 200 and the positions of the searched related contents in the unstructured information source 100. Those skilled in the art should understand that, the order of step S3 and S4 can be exchanged without influencing the essence of the present invention. In addition, two aspects are described here, i.e. forming other artifacts based on the searching result of step S2 (step S3), and creating linkages based on the searching results (step S4). Preferably, the two aspects can be combined together. But it should be understood that the execution of step S4 can be independent of that of step S3.

An important concept of the present invention is to correlate the formal, structured diagram with the informal, unstructured information based on the searching device, so as to provide an interactive and iterative diagram drawing process, improve the efficiency of the diagram drawing process, and make it easier to reuse and check of the formal diagram and the information source it is based on.

Figure 4:
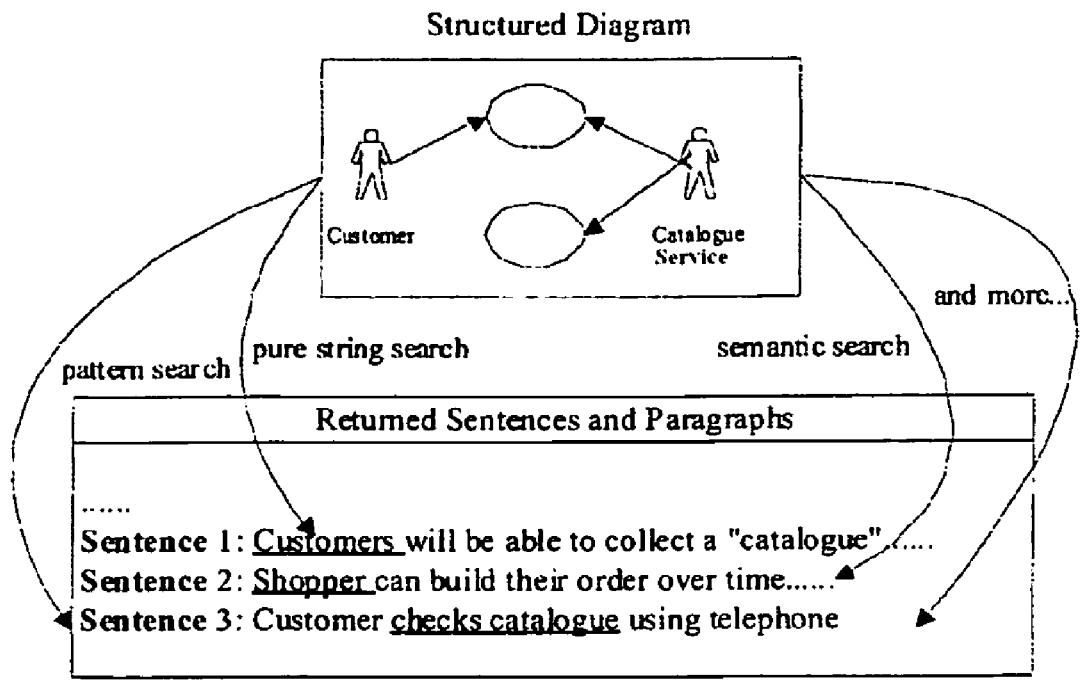
FIG. 4 illustrates various searching techniques that can be used in the present invention.

Now, the way to use searching techniques to correlate the structured diagram and the unstructured information will be described with respect to FIG. 4. FIG. 4 shows various searching techniques that can be used by the present invention. In addition to pure string match, when the architect/draftsman adds a corresponding requirement in his searching request, the search item analyzing device 20 can further analyze the search item inputted by the architect/draftsman to derive some other homogeneous or synonymous phrases which are provided to the searching device 30 together with the search item inputted by the architect/draftsman, so that the searching device 30 can return all the sentences or paragraphs containing the homogeneous or synonymous phrases of the search item inputted by the architect/draftsman. For example, as shown in the example of FIG. 1, if the architect/draftsman enters a search item "customer", the searching device 30 can finally return all the sentences or paragraphs containing the names having semantics of "customer" (such as the phrases of "shopper", "consumer", "client" etc.).

In addition, the searching device 30 can also conduct pattern search. For example, after establishing a use case "customer checks catalogue using telephone", the architect/draftsman can search string pattern "[n] check catalogue" where [n] is a person. Thus, the searching device may find "client checks catalogue by PDA (Personal Digital Assistant)". Therefore, new artifacts can be added into the diagram.

Figure 5:
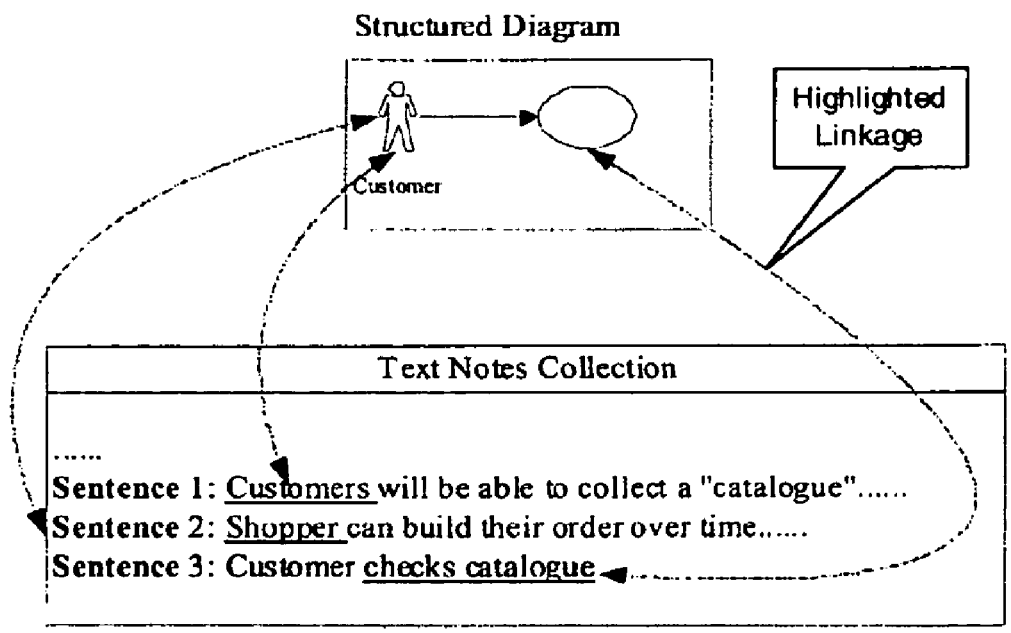
FIG. 5 illustrates the linkages between the structured diagram and the unstructured information.

FIG. 5 shows the linkages between the structured diagram and the unstructured information. The linkage established here is more than a simple link between an actor and its representation in the diagram. It can be a linkage between a use case diagram or part of a use case diagram and a sentence/paragraph in the text, such as the one marked "highlighted linkage" in FIG. 5. That is to say, linkages can be established between some of artifacts in the structured diagram and the corresponding contents in the unstructured information source. The established linkages serve as hyperlinks to help people navigate and switch between diagrams and text notes. This is very important for checking and reusing of the diagrams, especially when the original architect/draftsman is absent.

More particularly, sometimes, a paragraph or several continuous paragraphs of text in unstructured information source may correspond to a sub-diagram composed of a plurality of artifacts in the structured diagram. In this case, linkages between the sub-diagram and the paragraph(s) of text can be established. Therefore, the structured diagram drawing auxiliary apparatus can further comprise an identifying device (not shown) for identifying whether there is, in the unstructured information source, a continuous part of contents (such as a paragraph or several continuous paragraphs of text) which describes the information elements corresponding to all the artifacts constituting a sub-diagram and is not related to other artifacts outside the sub-diagram. If yes, the linkage generating device 30 can create a linkage between the sub-diagram and the position of the corresponding continuous contents in the unstructured information source. Of course, the above identifying process can also be performed by architects/draftsmen. The portion in the unstructured information source directed to by such linkage is usually the relatively important part with relatively high information density in the unstructured information source. The architect may encounter with similar description in the unstructured information source. If so he/she can reuse the corresponding sub-diagram and need not begin construction from basic artifacts.

Returning to FIG. 3, at step S5, if the user continues to input a search item related to another added artifact, the process returns to step S1, and continues to execute the steps of searching, creating linkages and so on in steps S1-S4.

If at step S5 the architect/draftsman considers that he/she has completed all the drawing operations (a necessary condition is that the returned context doesn't provide new information element for forming new artifact), i.e. all the requests in the text notes have been extracted and put into the diagram, so that he/she decides not to continue the above searching-linking-drawing process any more, the process proceeds to step S6, where the linkage distribution computing device 50 computes the distribution of the linkages in the unstructured information source. In fact, step S6 of computing linkage distribution can be executed immediately after the linkage is formed each time (step S3), i.e. the linkage distribution computing result can be updated at any time.

Next, a process for checking whether some information elements in the unstructured information source 100 are missed in the drawn structured diagram 200 is described. Since the present invention creates linkages between the structured diagram 200 and the corresponding contents in the unstructured information source 100, we can check whether some information elements are missed therein by checking the linkage distribution in the unstructured information source 100. For those parts with no or few linkages, the architect/draftsman is required to pay further attention. As for how many linkages in one part can be referred to as "few linkages", it changes depending on many aspects such as origin or purpose of the unstructured information sources. Since what provided is simply a warning, it is not necessarily to give a specific limitation in the present invention.

Figure 6:
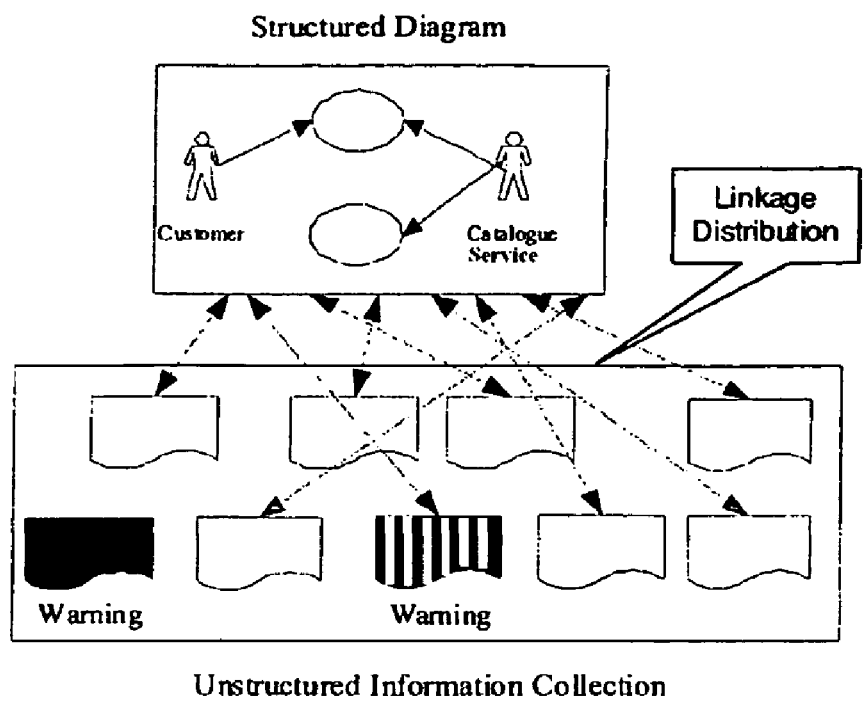
FIG. 6 illustrates the diagram verification based on the established linkage.

At step S7, it is judged whether there is a part (parts) with few linkages or even no linkage at all. If there are no such parts, then the process ends and the drawing is completed. If yes, that is to say, if it is found that a considerable part of contents has no or very few linkages therein, then at step S8, the warning generating device 60 generates warnings for these parts. FIG. 6 shows the mode for the verification based on the established linkage. As shown in FIG. 6, warnings can be offered to the architect/draftsman based on the distribution of the linkages between the structured diagram and the unstructured information source. Based on the difference of distribution densities, such warnings can be classified into various levels. As shown in FIG. 2, the warning generating device 60 may include a linkage distribution classifying device 61 and a classified warning generating device 62. The linkage distribution classifying device 61 classifies each part into a plurality of levels based on the linkage distribution density of each part in the unstructured information source 100. The classified warning generating device 62 generates different levels of warnings for the parts with different linkage distribution levels based on the different linkage distribution levels. For example, as shown in FIG. 6, the part of note at lower left of the unstructured information source 100 has no linkage, so it is offered a highest level of warning (shown in all black in FIG. 6). The lower third part of note has linkages but the linkage distribution is relatively sparse, so it is offered a relatively low level of warning (shown in a stripe shape in FIG. 6). The warnings can be offered in different forms, such as text, audio or graphic ones. In each form different levels of warnings can be distinguished.

For warnings, at step S9, the architect/draftsman judges whether it is needed to further extract information elements from the parts prompted by the warnings, so as to add corresponding artifacts in the structured diagram 100. The architect/draftsman can make the judgment by roughly reading, he/she can also make the judgment based on previous rough knowledge of the part of content or the property or importance of the part of content. At step S9, if the architect/draftsman decides to add artifacts into the structured diagram 100, then the process returns to step S1, and if the architect/draftsman does not think adding is necessary, the process ends and the drawing is completed.

In the above description, the respective steps of the structured diagram drawing auxiliary method shown in FIG. 3 are described as being executed by the respective devices of the structured diagram drawing auxiliary apparatus shown in FIG. 2. In fact, the structured diagram drawing auxiliary method can be executed by other apparatuses or in other manner.

Figure 7:
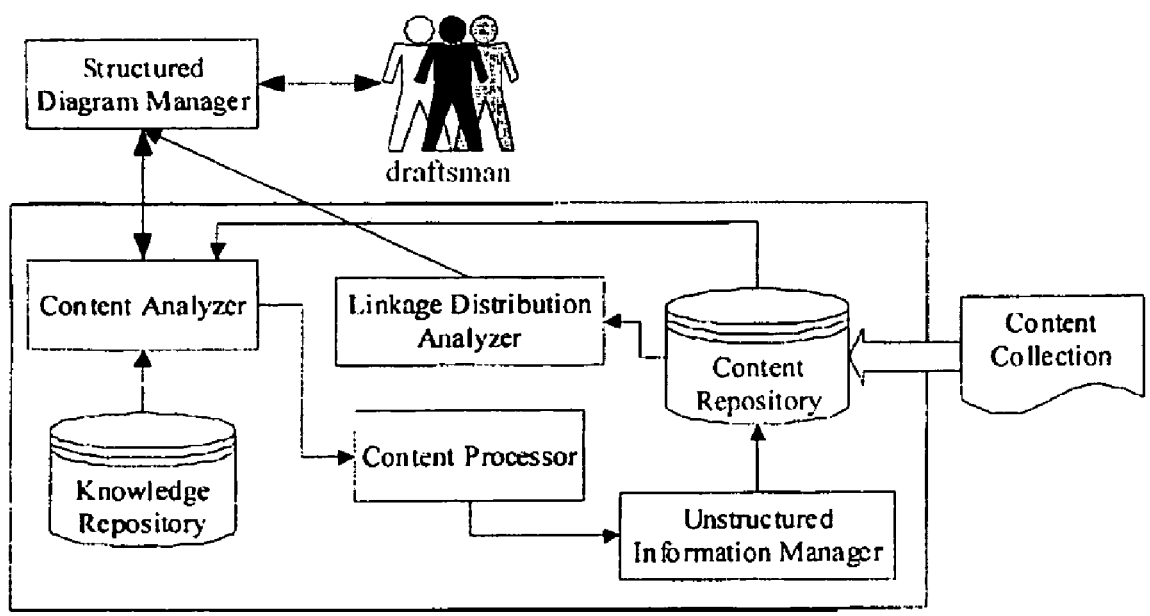
FIG. 7 illustrates the architecture of a structured diagram drawing auxiliary apparatus according to another embodiment of the present invention.

FIG. 7 shows the architecture of a structured diagram drawing auxiliary device according to another embodiment of the present invention. The device consists of the following components: a content analyzer for searching for related sentences or paragraphs from unstructured information based on user's input to a diagram manager and with the help of a knowledge repository; a content processor for processing the found contents and generating an action list that will help user develop the diagram including identification of the artifacts and linkages between the relevant texts and the elements in the diagram through interaction with the diagram author; an unstructured information manager for creating the index of the relevant contents and established linkages; a structured diagram manager for editing/displaying the diagrams; a linkage distribution analyzer for analyzing the linkage distribution and showing multi-level warnings if necessary; a knowledge repository for accumulating reusable knowledge, such as thesaurus and sentence patterns etc.; and a content repository for storing document contents and linkages between the documents and the diagrams.

While the present invention has been shown and described with respect to the preferred embodiments thereof, those skilled in the art should understand that various changes in forms and details can be made therein without departing from the spirit and scope of the invention as defined by the following claims.

What is claimed is:

1. A method of forming a structured diagram from an unstructured information source, wherein at least one artifact is formed in the structured diagram to represent at least one information element included in the unstructured information source, the information element being objects or interactive relations among the objects involved in the unstructured information source, the method comprising the steps of:

receiving, at a processor of a device, a search item which is inputted by a user and represents an information element;

searching, via the processor, for contents related to the information elements represented by the search item in the unstructured information source based on the search item inputted by the user;

for each information element, creating, via the processor, a linkage between the corresponding artifact formed in the structured diagram and a position of the related content searched in the unstructured information source;

computing a distribution of the linkages in the unstructured information source; and showing warnings for the parts with few linkages or no linkage at all.

2. The method according to claim 1, further comprising the step of forming one or more artifacts corresponding to the information elements in the structured diagram based on the searched contents.

3. The method according to claim 1, further comprising the steps of:

displaying the searched contents to help the user extract other search items representing other information elements correlated with said information elements, so as to allow the user to further add other artifacts corresponding to the other information elements into the structured diagram; and when the user inputs a search item representing other information elements again, further performing the operations of searching and creating linkage for the search item.

4. The method according to claim 1, wherein various levels of warnings are shown based on a linkage distribution density.

5. The method according to claim 1, further comprising the steps of:

analyzing the search item which is inputted by the user and represents an information element;

providing other search items which may represent the information element; and searching for the contents related to the information element in the unstructured information source based on said other search items.

6. The method according to claim 1, further comprising the step of: when finding a continuous part of contents in the unstructured information source which describes the information elements corresponding to all the artifacts constituting a sub-diagram in the structured diagram and is not related to other artifacts, forming a linkage between the sub-diagram and the position of the continuous contents in the unstructured information source.

7. An apparatus for forming a structured diagram from an unstructured information source, wherein at least one artifact is formed in the structured diagram to represent at least one information element included in the unstructured information source, the information element being objects or interactive relations among the objects involved in the unstructured information source, the apparatus comprising:

a receiving device for receiving a search item which is inputted by a user and represents an information element;

a searching device for searching for contents related to the information elements represented by the search item in the unstructured information source based on the search item inputted by the user;

a linkage creating device for creating a linkage between the corresponding artifact formed in the structured diagram and a position of the related content searched in the unstructured information source, for each information element;

a linkage distribution computing device for computing the distribution of the linkages in the unstructured information source; and a warning generating device for generating warnings for the parts with few linkages or no linkage at all.

8. The apparatus according to claim 7, further comprising a structured diagram managing device for forming one or more artifacts corresponding to the information elements in the structured diagram based on the searched contents.

9. The apparatus according to claim 7, further comprising a display device for displaying the searched contents to help the user extract other search items representing other information elements correlated to said information elements, so as to allow the user to further add other artifacts corresponding to the other information elements into the structured diagram, wherein when the user further inputs a search item representing other information elements via the receiving device, the searching device and the linkage creating device further perform the operations of searching and creating linkage for the other information element, respectively.

10. The apparatus according to claim 7, wherein the warning generating device comprises:

a linkage distribution classifying device for classifying the respective parts in the unstructured information source into a plurality of levels based on the linkage distribution density of the respective parts; and a classified warning generating device for generating various levels of warnings for various parts based on different linkage distribution levels.

11. The apparatus according to claim 7, further comprising a search item analyzing device for analyzing the search item which is inputted by the user and represents an information element, providing other search items which may represent the same information element, and providing them together with the search item inputted by the user to the searching device for searching.

12. The apparatus according to claim 7, further comprising an identifying device for identifying whether there are some continuous parts of contents in the unstructured information source that describe the information elements corresponding to all the artifacts constituting some sub-diagrams in the structured diagram and are not related to other artifacts, wherein when the identifying device identifies that there do exist such continuous parts of contents, the linkage creating device further creates linkages between the sub-diagrams and the corresponding positions of the continuous contents in the unstructured information source.

* * * * *